(12) United States Patent
Versteeg et al.

(10) Patent No.: US 10,523,705 B2
(45) Date of Patent: *Dec. 31, 2019

(54) PASSWORD BREACH REGISTRY

(71) Applicant: CA, Inc., New York, NY (US)

(72) Inventors: Steven Cornelis Versteeg, Ivanhoe (AU); Nathan Allin Hastings, Glen Iris (AU); Xien Yao, Doncaster (AU); John Sinclair Bird, Ringwood North (AU)

(73) Assignee: CA, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/160,178

(22) Filed: Oct. 15, 2018

(65) Prior Publication Data

US 2019/0052673 A1   Feb. 14, 2019

Related U.S. Application Data

(63) Continuation of application No. 15/920,873, filed on Mar. 14, 2018, which is a continuation of application No. 15/254,464, filed on Sep. 1, 2016, now Pat. No. 10,079,855.

(51) Int. Cl.
*H04L 29/06* (2006.01)

(52) U.S. Cl.
CPC .......... *H04L 63/1466* (2013.01); *H04L 63/06* (2013.01); *H04L 63/083* (2013.01); *H04L 63/10* (2013.01)

(58) Field of Classification Search
CPC ....................................... H04L 63/06
USPC ............................................. 726/4
See application file for complete search history.

(56) References Cited

U.S. PATENT DOCUMENTS

| 9,077,747 | B1* | 7/2015 | Chen ................... H04L 63/1441 |
| 9,449,319 | B1* | 9/2016 | Agarwal .............. G06Q 20/382 |
| 2008/0184349 | A1* | 7/2008 | Ting ..................... H04L 9/3231 726/7 |
| 2011/0083181 | A1* | 4/2011 | Nazarov ............... G06F 21/562 726/23 |

OTHER PUBLICATIONS

Final Office Action dated Mar. 15, 2019 in U.S. Appl. No. 15/920,873, 13 pages.

(Continued)

*Primary Examiner* — Longbit Chai
(74) *Attorney, Agent, or Firm* — Shook, Hardy & Bacon L.L.P.

(57) ABSTRACT

A password breach registry is utilized to secure a service provided by a service provider. The password breach registry is a publicly accessible registry and includes password tokens written by breached service providers. The password tokens indicate passwords used to access breached service providers that may have been breached. A service provider can subscribe to the password breach registry and periodically query the password breach registry to determine if a password token corresponding to a user of a service provided by the service provider has been written to the password breach registry. This may indicate that the user of the service utilizes the same password on other services that have been breached. Upon determining that the password token has been written to the password breach registry, the user can be locked out from the service to prevent a malicious actor from gaining access to the account of the user.

19 Claims, 4 Drawing Sheets

(56) References Cited

OTHER PUBLICATIONS

Non-Final Office Action dated Nov. 21, 2018 in U.S. Appl. No. 15/920,873, 11 pages.
Notice of Allowance dated Dec. 26, 2018 in U.S. Appl. No. 15/920,857, 15 pages.

* cited by examiner

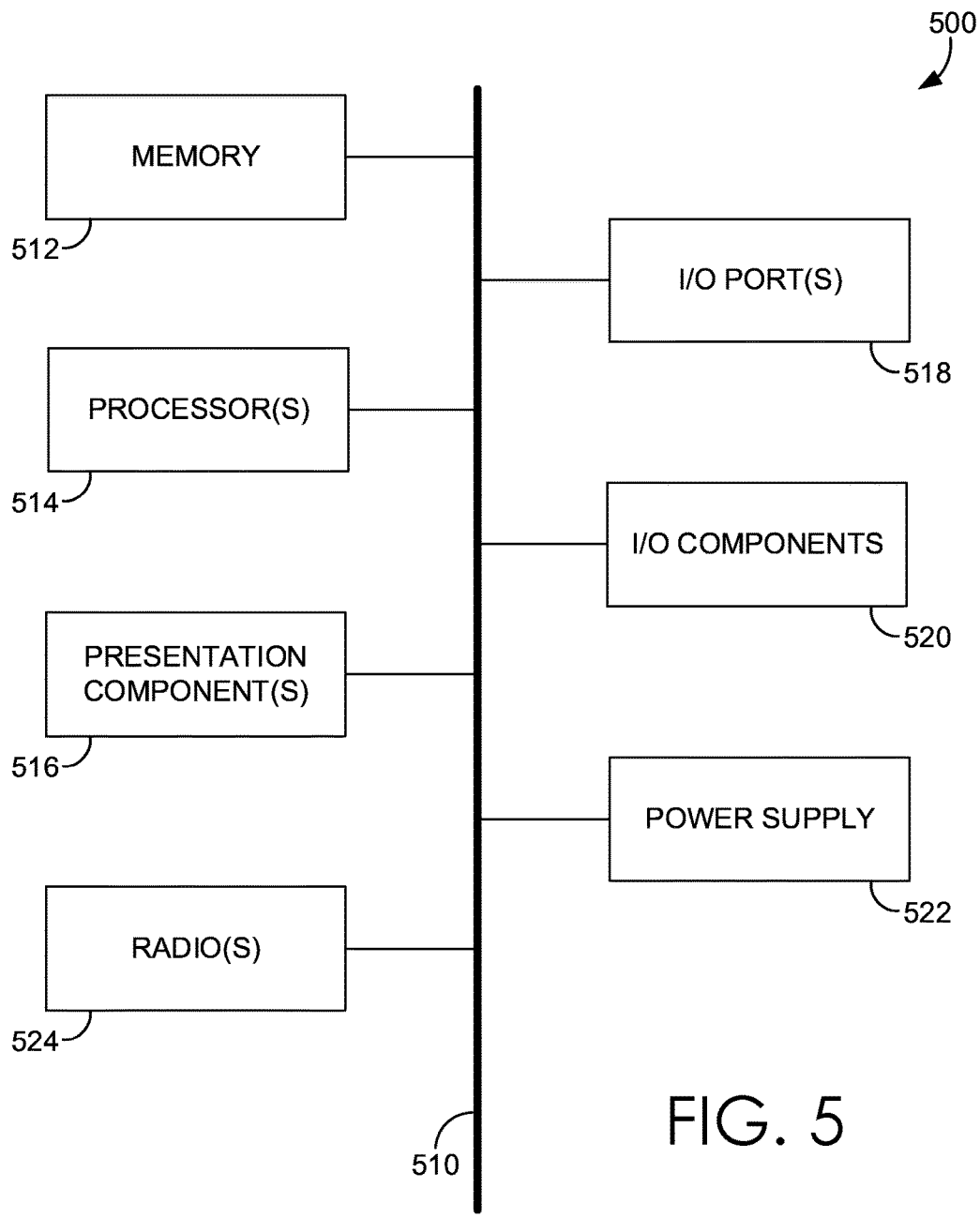

PASSWORD BREACH REGISTRY

RELATED APPLICATIONS

This application is a continuation of and claims priority to U.S. application Ser. No. 15/920,873 filed Mar. 14, 2018, which is a continuation of U.S. application Ser. No. 15/254,464 filed Sep. 1, 2016, now U.S. Pat. No. 10,079,855, issued Sep. 18, 2018.

BACKGROUND

The vast majority of websites and applications accessible via the Internet or a mobile device offer some sort of sign in or sign up functionality. This functionality enables a user of a particular website or application to create an account or access the account associated with the respective service provided by the website or application. Passwords associated with the user accounts are typically stored in some variety of database or directory. As the increasing rate of password breaches provide constant reminders, these password databases or directories can be accessed by malicious actors. Consequently, the passwords can then be used against the user that originally signed up for the particular website or application.

To add to this problem, users often reuse the same username and password on multiple websites or applications. If one database or directory is breached, an attacker may be able to access additional websites or applications by simply retrying the same credentials on the additional websites or applications.

SUMMARY

This summary is provided to introduce a selection of concepts in a simplified form that are further described below in the detailed description. This summary is not intended to identify key features or essential features of the claimed subject matter, nor should it be used as an aid in determining the scope of the claimed subject matter.

Embodiments of the present disclosure relate to utilizing a password breach registry to secure a service. The password breach registry is a publicly accessible registry and includes password tokens written by breached service providers. The password tokens indicate passwords used to access breached service providers that may have been breached. A service provider can subscribe to the password breach registry and periodically query the password breach registry to determine if a password token corresponding to a user of a service provided by the service provider has been written to the password breach registry. This may indicate that the user of the service utilizes the same password on other services that have been breached. Upon determining that the password token has been written to the password breach registry, the user can be locked out from the service to prevent a malicious actor from gaining access to the account of the user.

BRIEF DESCRIPTION OF THE DRAWINGS

The present disclosure is described in detail below with reference to the attached drawing figures, wherein:

FIG. 5 is a block diagram of an exemplary computing environment suitable for use in implementing embodiments of the present disclosure.

DETAILED DESCRIPTION

Figure 1:
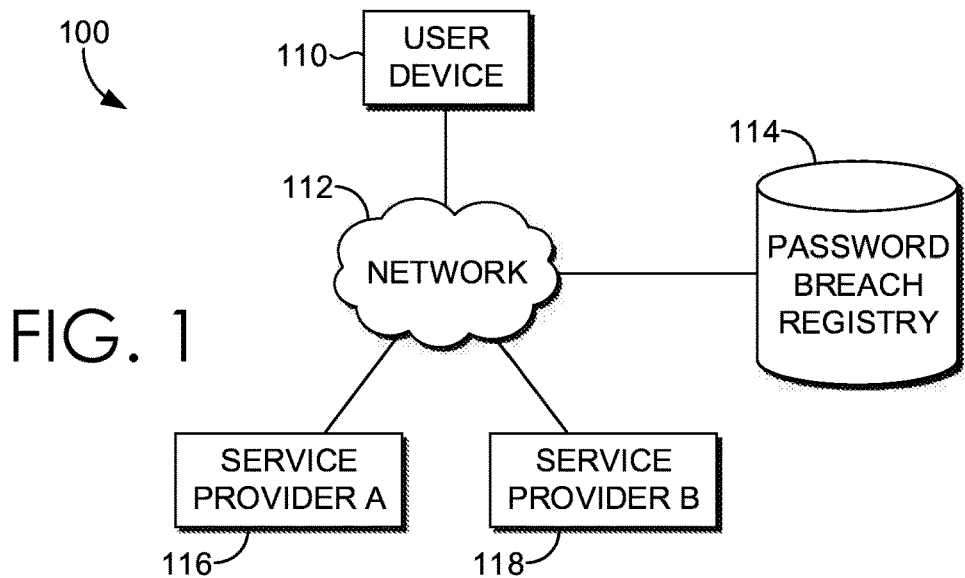
FIG. 1 is a block diagram showing a password breach registry system for utilizing a password breach registry to secure a service, in accordance with an embodiment of the present disclosure.

The subject matter of the present disclosure is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described. As used herein, the singular forms "a," "an," and "the" are intended to include the plural forms as well, unless the context clearly indicates otherwise.

As noted in the background, passwords associated with user accounts utilized to access services provided by websites or applications are typically stored in some variety of database or directory. Malicious actors are becoming increasingly adept at breaching these databases or directories and stealing user passwords. As a result, the passwords can be used against the user that originally signed up for the particular website or application. The malicious actors may attempt to access other services provided by other websites or applications utilizing the same passwords. If any users reuse the same username and password on these other services, the malicious actors may be able to access them as well.

Embodiments of the present disclosure are generally directed to utilizing a public password breach registry to secure a service. In this way, users are protected from malicious actors that have stolen passwords from a breached service by preventing the malicious actors from using the stolen passwords to breach additional services. Password tokens corresponding to passwords of user accounts that have been compromised are published to the password breach registry by the breached service provider. The password breach registry is a blockchain-like format which, as explained in more detail below, prevents tampering and revision. Password tokens identify passwords of users that have been or may have been compromised. A subscribing provider may periodically search the password breach registry to determine whether a password used by a user of its service has been written to the password breach registry. If the subscribing provider determines that a password token corresponding to a password of a subscribing user has been written to the password breach registry, the subscribing provider can take proactive steps to lock the account of the affected user and/or force the user to provide additional credentials prior to accessing the account.

For example, assume a user signs up for both GMAIL and EBAY accounts and happens to use the same password on both sites. If an attacker is able to compromise a service provided by EBAY and steal EBAY passwords, the attacker may be able to access the GMAIL account. To prevent additional attacks, when EBAY discovers the breach, EBAY can publish accounts that were potentially exposed to the public (such as via the dark web—need to add stuff on this). If GMAIL is monitoring the password breach registry, GMAIL is able to determine which GMAIL users may be at risk and take steps to deny an attacker any access using the stolen passwords.

To make public the fact that these passwords have been breached, without releasing any information which ties a password back to an individually identifiable user to the general public and without releasing any information which can identify the original password, EBAY may publish password tokens of all the passwords thought to have been compromised. As a subscriber to the password breach registry, GMAIL searches for any password tokens which match password tokens in its own repository. GMAIL may then automatically reset those breached passwords and force those users to reauthenticate and select new passwords. In embodiments, these proactive measures may be accomplished via email, SMS, in-person, and the like.

Accordingly, one embodiment of the present disclosure is directed to a non-transitory computer storage medium storing computer-useable instructions that, when used by a computing device, causes the computing device to perform operations to facilitate utilizing a password breach registry to secure a service. The operations comprise subscribing, by a first service provider, to a password breach registry that comprises password tokens written by breached service providers. The password tokens indicate passwords that have been breached. The operations also comprise querying, by the first service provider, the password breach registry to determine if a password token corresponding to a user of a service provided by the first service provider has been written to the password breach registry. The operations further comprise, upon determining the password token has been written to the password breach registry, locking out the user from the service.

In another embodiment, the present disclosure is directed to a computer-implemented method to facilitate utilizing a password breach registry to secure a service. The method comprises determining a hash function for a breached token written to a password breach registry, the breached token corresponding to a breached user of a breached service. The method also comprises, upon determining the hash function is used by a first service provider to create a first service token, comparing the breached token to the first service token. The method further comprises, upon determining the hash function is not used by the first service provider to create the first service token, utilizing the hash function for a first service password of the user to create a comparable first service token and comparing the breached token to the comparable first service token. The method also comprises, based on the comparing, determining the first service token or the comparable first service token is the breached token and locking out the user from the service.

In yet another embodiment, the present disclosure is directed to a computerized system for facilitating utilizing a password breach registry to secure a service. The system includes a processor and a computer storage medium storing computer-useable instructions that, when used by the processor, cause the processor to determine a hash function for a breached token written to a password breach registry. The breached token corresponds to a breached user of a breached service. The breached token is compared to a first service token that was created by the first service provider with a first service password of the user by utilizing the hash function. Based on the comparing, the first service token is determined to be the breached token and the user is locked out from the service.

Referring now to FIG. 1, a block diagram is provided that illustrates a password breach registry system 100 for utilizing a password breach registry to secure a service, in accordance with an embodiment of the present disclosure. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory. The password breach registry system 100 may be implemented via any type of computing device, such as computing device 500 described below with reference to FIG. 5, for example. In various embodiments, the password breach registry system 100 may be implemented via a single device or multiple devices cooperating in a distributed environment.

The password breach registry system 100 generally operates to provide a password breach registry that enables subscribers to publish tokens that identify passwords of users that may have been breached. As shown in FIG. 1, the password breach system 100 includes, among other components not shown, a user device 110, a password breach registry 114, service provider A 116, and service provider B 118. It should be understood that the password breach registry system 100 shown in FIG. 1 is an example of one suitable computing system architecture. Each of the components shown in FIG. 1 may be implemented via any type of computing device, such as computing device 500 described with reference to FIG. 5, for example.

The components may communicate with each other via a network 112, which may include, without limitation, one or more local area networks (LANs) and/or wide area networks (WANs). Such networking environments are commonplace in offices, enterprise-wide computer networks, intranets, and the Internet. It should be understood that any number of user devices, password breach registries, and service providers may be employed within the password breach system 100 within the scope of the present disclosure. Each may comprise a single device or multiple devices cooperating in a distributed environment. For instance, the password breach registry 114 may be provided via multiple devices arranged in a distributed environment that collectively provide the functionality described herein. Additionally, other components not shown may also be included within the network environment.

As shown in FIG. 1, the password breach system 100 includes a password breach registry 114. While only a single password breach registry 114 is shown in FIG. 1, it should be understood that the password breach registry system 100 may employ any number of password breach registries (which may include local copies of the password breach registry that are regularly synchronized with the password breach registry). The password breach registry 114 may be utilized by service provider A 116 and/or service provider B 118 to prevent malicious actors from breaching services provided by service provider A 116 and/or service provider B 118.

In embodiments, the password breach registry 114 is in a blockchain-like format that prevents tampering and revision. The blockchain-like format provides a publicly accessible distributed database that maintains a continuously growing list of data blocks. Each data block contains time-stamped batches of transactions and a hash of the prior block. This enables the blocks to be linked together to form a chain. The transactions are the content (e.g., password tokens) that is stored in the password breach registry 114 and are provided via service providers 116, 118 or user devices 110. A service provider 116, 118 or user device 110 is able to connect to the password breach registry 114 via the network 112, send new transactions to it, verify transactions, and create new blocks.

Additionally or alternatively, a service provider 116, 118 or user device 110 can maintain a local copy of the password breach registry. Transactions may be provided to the local copy of the password breach registry and broadcast to the password breach registry 114. Each service provider having a local copy of the password breach registry 114 may receive the broadcasted transactions. Because each service provider has a local copy of the password breach registry 114, there is no need to have a centralized database managed by a trusted third party. Transactions can be broadcast to the network using software applications. As a service provider validates transactions, the transactions are added to the local copy and broadcast to other service providers. Alternatively, each service provider having a local copy of the password breach registry 114 may periodically or on an ad hoc basis synchronize with the password breach registry 114.

The local copy of the password breach registry can be queried periodically or on an ad hoc basis to determine whether any password tokens match a password token that corresponds to a password of the user or a user affiliated with the service password. Having a local copy of the password breach registry 114 enables the service provider 116, 118 or user device 110 to maintain privacy over the queries that are run against the password breach registry 114.

In embodiments, the password breach registry system 100 enables each subscribing service provider to query the latest version of the password breach registry, even though a breached service provider may publish password tokens to local copies of the password breach registry (which are synchronized with the password breach registry 114). A subscribing service provider may determine, with reasonable certainty, whether a transaction (i.e., a password token corresponding to a user of the subscribing service provider) does or does not exist in the dataset which enables the service provider to readily identify whether any users of its service utilize a password token that has been written to the password breach registry.

Further, because of the blockchain-format, there is a prohibitively high cost to attempt to rewrite or alter transaction history. This prevents a malicious actor from modifying or removing password tokens that have already been written to the password breach registry 114. For example, if a password token has been written to the password breach registry 114 indicating a user of a service has had its password stolen, a malicious actor cannot simply modify or remove the password token. Rather, since it has already published to the blockchain, other service providers are able to take steps to protect services they provide that the user accesses with the same credentials.

For clarity, a password token is a protected or encrypted version of a password. In this way, if a particular password has been leaked, the breached service provider publishes the password token to the password breach registry 114 and the actual password that has been breached is not revealed. In some embodiments, a cryptographic hash function is used to generate a password token and protect the content of the actual password. A cryptographic hash function is a mathematical algorithm that maps data of arbitrary size (i.e., the password) to a bit string of a fixed size (i.e., the password token). The hash function is designed to be a one-way function so the password cannot be reverse engineered. Examples of hash functions may include, without limitation, secure hash algorithm 2 (SHA-2) or SHA-3 (formerly referred to as Keccak). It is contemplated that any hash function may be used any number of times in accordance with embodiments of the present disclosure.

Additionally or alternatively, the password token may be an associative label created by the user that the user mentally associates with the password (e.g., "Main Password"). An example of this might be a string that the user writes down and associates with a particular site. Another example might be a password hint the user selects to help the user remember the password for the particular site. In each example, discovery of this string does not reveal the actual password.

In some embodiments, the password token is automatically generated by a password manager, a separate application, or a browser plugin. Alternatively, the service provider may generate the password token based on the password. In this scenario, the password is changed significantly and in a computationally expensive way to prevent a malicious actor from regenerating the password from the token. For example, the service provider may utilize a hash function, as described above, to hash the password a random and high number of times. The username may be utilized as a salt, or additional input, to the one-way hash function. The incorporation of the username as a salt may deter brute force dictionary attacks against a list of password hashes or precomputed rainbow table (i.e., a precomputed table used to reverse cryptographic hash functions) attacks.

Figure 2:
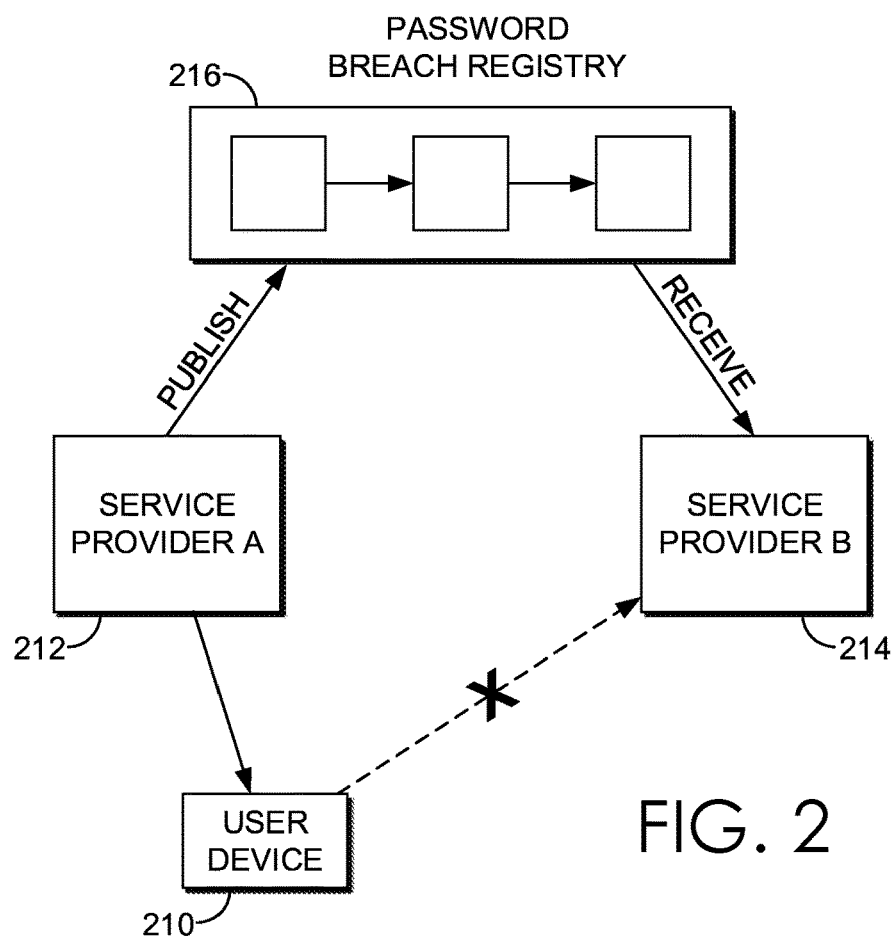
FIG. 2 is a flow diagram showing an exemplary password breach registry that can be utilized to prevent a breach at a second site after a first site has been breached, in accordance with an embodiment of the present disclosure.

In practice, and referring now to FIG. 2, upon determining a service has been breached, service provider A 212 writes a new block to the password breach registry 216. As mentioned above the new block contains a password token so that information about the password (e.g., content, length) is protected. In embodiments, the password token is a word or random string created by the user that the user mentally associates with a particular password. In embodiments, the password token is generated automatically by a password manager, a separate application, or a browser plugin. In embodiments, the password token is generated by service provider A 212, utilizing a hash function, as described above. Additionally, service provider A 212 may publish the username corresponding to the breached password as well as the hash function utilized to create the password token.

Service provider B 214 may periodically or regularly query the password breach registry 216 for usernames and/or password tokens that correspond to usernames and/or password tokens associated with a service (i.e., service B) provided by service provider B 214. Additionally or alternatively, service provider B 214 may synchronize a local copy of the password breach registry with the password breach registry 216 and query only the local copy of the password breach registry. By only querying the local copy of the password breach registry, service provider B 214 may further protect its users by not exposing content of user queries to the outside world. This implementation prevents a malicious actor from intercepting the queries and identifying users of service B. If the malicious actor is able to identify users of service B, the malicious actor may attempt to breach service B using stolen passwords from other services.

As noted above, in some embodiments, each password token includes or is published with a hash function utilized by a particular breached service provider to create the password token. If the service provider (i.e., service provider B) querying the password breach registry 216 utilizes a different hash function than a service provider (i.e., service provider A) that has published password tokens to the password breach registry 216, service provider B will be unable to identify whether users of service B have credentials that have been breached because the password tokens will not match. Accordingly, service provider B can create comparable tokens by hashing passwords for each user of service B utilizing the identified hash function. In some embodiments, service provider B identifies common users with service provider A (by comparing published user names of service A to user names of service B). To conserve resources, service provider B can create comparable tokens for only the common users.

Upon service provider B 214 determining a user of service B has been the victim of a breach at a different service, service provider B 214 locks the user out of the account for service B. At this point, the malicious actor is no longer able to breach service B utilizing the stolen credentials. The user is only able to utilize service B again after fulfilling proactive safety measures required by service provider B 214.

In some embodiments, service provider B 214 sends the user an email that requires the user to follow a link provided in the body of the email that enables the user to provide a new password. In some embodiments, the link initially requires the user to provide additional information prior to being able to provide a new password. In some embodiments, the link forces the user to authenticate via a third-party website or service. The use of the link provides service provider B 214 confirmation that the user is not the malicious actor.

In some embodiments, service provider B 214 sends the user a short message service (SMS) text that provides the user a code to enter prior to providing a new password. The SMS text may also contain a link, as described above, that the user can follow to provide a new password or additional information prior to utilizing service B. In this way, the code enables service provider B 214 to confirm that the user is not the malicious actor.

In some embodiments, service provider B 214 may require the user to provide in-person verification of the user's identity. For example, service provider B 214 may send the user a communication asking the user to provide proof of identification at a nearby location (e.g., an office, a retail setting, etc.). Examples of proof of identification may include photo identification, signature confirmation, device identification, and the like.

Each of the proactive safety measures described above prevent stolen credentials from being tested and used to access other services the user accesses with the same credentials. In this way, a malicious actor is unable to use credentials taken from a breached service and attempt to access other services using the stolen credentials. Rather, once password tokens have been published to the password breach registry by service provider A 212, service provider B 214 can compare the breached password tokens to password tokens for users of service B. Upon identifying any matches, service provider B 214 locks out the corresponding user from accessing service B until the required proactive measures have been satisfied.

Figure 3:
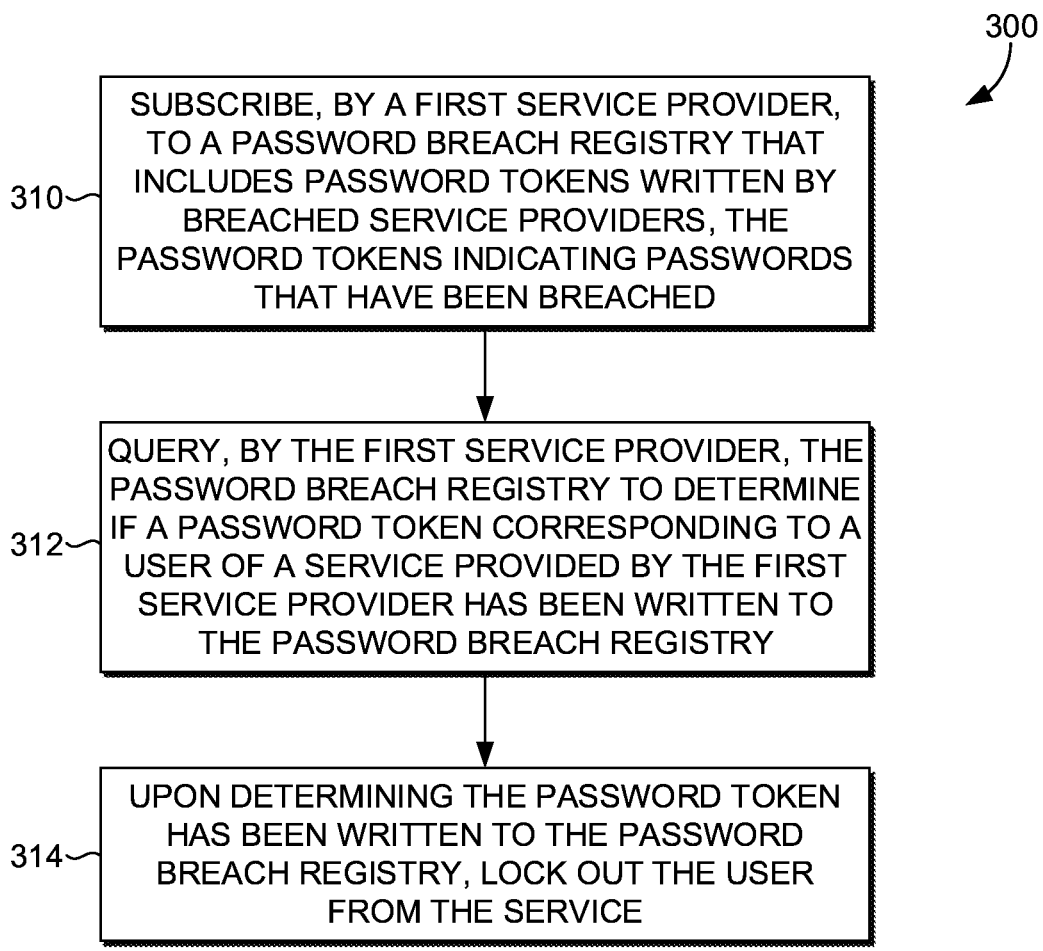
FIG. 3 is a flow diagram showing a method for utilizing a password breach registry to secure a service, in accordance with an embodiment of the present disclosure.

Turning now to FIG. 3, a flow diagram is provided that illustrates a method 300 for utilizing a password breach registry to secure a service, in accordance with an embodiment of the present disclosure. For instance, the method 300 may be employed utilizing the password breach registry system 100 of FIG. 1. As shown at step 310, a first service provider subscribes to a password breach registry that includes password tokens written by breached service providers. As described above, the password tokens indicate passwords that have been breached.

In some embodiments, the password tokens include usernames, hashed passwords, and hash functions used by the breached service providers. The password tokens may be random strings created by users or generated by a password manager. The password tokens may not include any personally identifiable information or information that identifies the passwords. Regardless of how the password tokens are created, the corresponding passwords cannot be reconstructed using the password tokens.

The first service provider queries, at step 312, the password breach registry to determine if a password token corresponding to a user of a service provided by the first service provider has been written to the password breach registry. Upon determining the password token has been written to the password breach registry, at step 314, the user is locked out from the service.

In some embodiments, a hash function utilized by a particular breached service provider is identified. The hash function may be written to the password breach registry along with or, as mentioned above, as part of the password token. If the hash function is different than the one used by the first service provider to create password tokens, comparable tokens may be created by the first service provider. To do so, the first service provider hashes passwords for each user of the service provided by the first service provider utilizing the identified hash function. The password tokens published to the password breach registry can then be compared to the comparable tokens created by the first service provider.

In some embodiments, user names that have accounts with the first service provider are used in queries to the password breach registry to determine if similar user names have accounts that have been breached. If similar user names are found, password tokens of the similar user names can be compared to password tokens of user names that have accounts with the first service provider.

Figure 4:
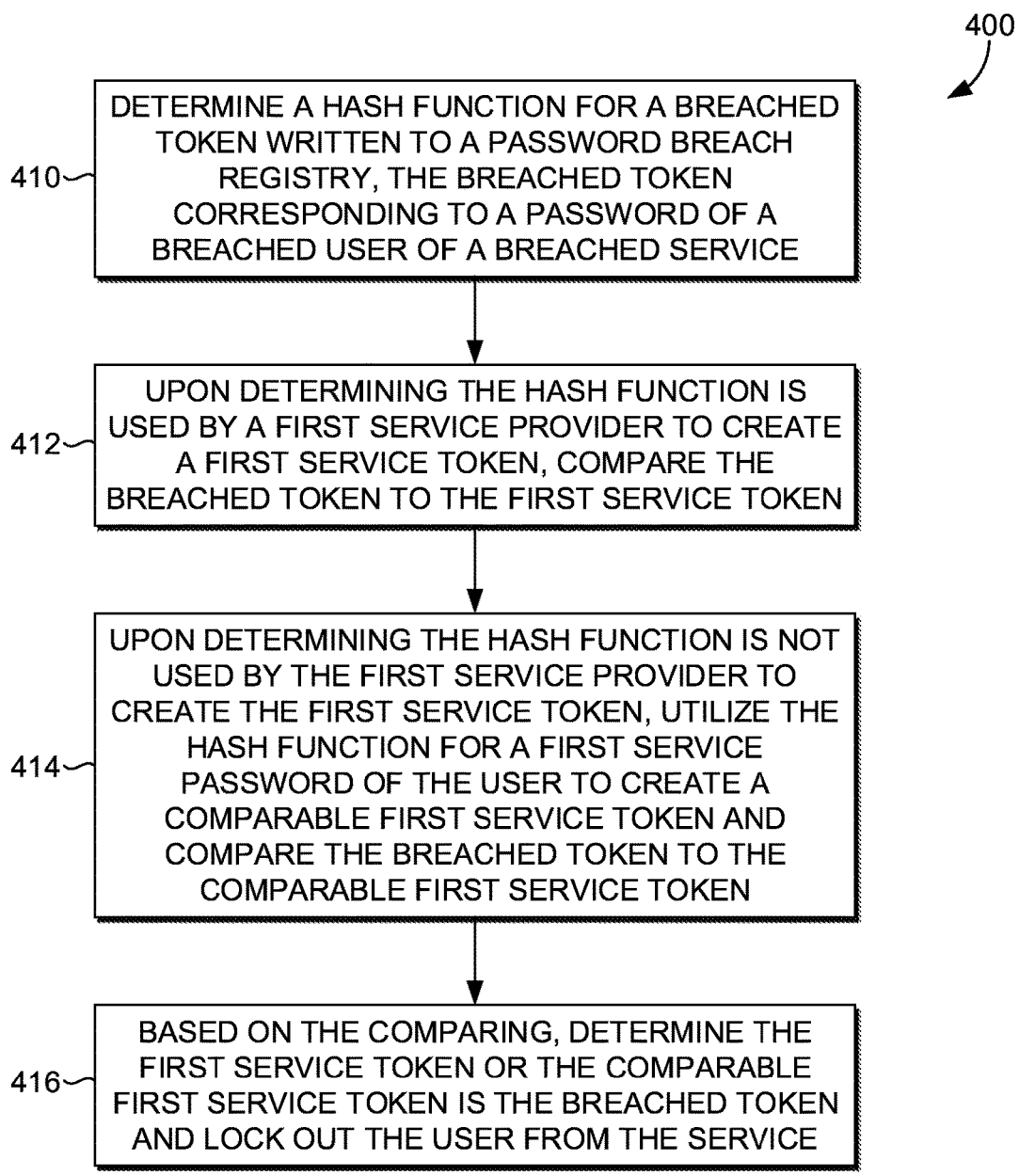
FIG. 4 is a flow diagram showing a method for locking out a user corresponding to a breached token from a service, in accordance with an embodiment of the present disclosure.

Referring now to FIG. 4, a flow diagram is provided that illustrates a method 400 for locking out a user corresponding to a breached token from a service, in accordance with an embodiment of the present disclosure. For instance, the method 400 may be employed utilizing the password breach registry system 100 of FIG. 1. As shown at step 410, a hash function for a breached token written to a password breach registry is initially determined. As described above, the breached token corresponds to a password of a breached user of a breached service.

Upon determining the hash function is used by a first service provider to create a first service token, the breached token is compared, at step 412, to the first service token. In other words, if the first service provider and a breached service provider of a breached service utilize the same hash function, then password tokens created by each service provider can be compared to determine if the corresponding passwords are the same.

On the other hand, if the first service provider and a breached service provider of a breached service do not utilize the same hash function, then password tokens created by each service provider cannot be compared to determine if the corresponding passwords are the same. In this case, upon determining the hash function is not used by the first service provider to create the first service token, the hash function utilized by the breached service provider is utilized, at step 414, for a first service password of the user to create a comparable first service token. The breached token can then be compared to the comparable first service token.

In some embodiments, the first token and the breached token are generated by a password manager utilizing a hash function. Alternatively, the first token may be generated by the first service provider utilizing a first service hash function and the breached token may be generated by the breached service provider utilizing the hash function. The breached token may not include any personally identifiable information or information that identifies the password. Additionally, a password cannot be reconstructed using the breached token.

Based on the comparing, it is determined, at step 416, that the first service token or the comparable first service token is the breached token and the user is locked out from the service. In some embodiments, the user is required to change a password before utilizing the service. Consequently, a new first service token may be generated for the user.

Having described embodiments of the present disclosure, an exemplary operating environment in which embodiments of the present disclosure may be implemented is described below in order to provide a general context for various aspects of the present disclosure. Referring to FIG. 5 in particular, an exemplary operating environment for implementing embodiments of the present disclosure is shown and designated generally as computing device 500. Computing device 500 is but one example of a suitable computing environment and is not intended to suggest any limitation as to the scope of use or functionality of the inventive embodiments. Neither should the computing device 500 be interpreted as having any dependency or requirement relating to any one or combination of components illustrated.

The inventive embodiments may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The inventive embodiments may be practiced in a variety of system configurations, including handheld devices, consumer electronics, general-purpose computers, more specialty computing devices, etc. The inventive embodiments may also be practiced in distributed computing environments where tasks are performed by remote-processing devices that are linked through a communications network.

With reference to FIG. 5, computing device 500 includes a bus 510 that directly or indirectly couples the following devices: memory 512, one or more processors 514, one or more presentation components 516, input/output (I/O) ports 518, input/output (I/O) components 520, and an illustrative power supply 522. Bus 510 represents what may be one or more busses (such as an address bus, data bus, or combination thereof). Although the various blocks of FIG. 5 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors recognize that such is the nature of the art, and reiterate that the diagram of FIG. 5 is merely illustrative of an exemplary computing device that can be used in connection with one or more embodiments of the present disclosure. Distinction is not made between such categories as "workstation," "server," "laptop," "handheld device," etc., as all are contemplated within the scope of FIG. 5 and reference to "computing device."

Computing device 500 typically includes a variety of computer-readable media. Computer-readable media can be any available media that can be accessed by computing device 500 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 500. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 512 includes computer storage media in the form of volatile and/or nonvolatile memory. The memory may be removable, non-removable, or a combination thereof. Exemplary hardware devices include solid-state memory, hard drives, optical-disc drives, etc. Computing device 500 includes one or more processors that read data from various entities such as memory 512 or I/O components 520. Presentation component(s) 516 present data indications to a user or other device. Exemplary presentation components include a display device, speaker, printing component, vibrating component, etc.

I/O ports 518 allow computing device 500 to be logically coupled to other devices including I/O components 520, some of which may be built in. Illustrative components include a microphone, joystick, game pad, satellite dish, scanner, printer, wireless device, etc. The I/O components 520 may provide a natural user interface (NUI) that processes air gestures, voice, or other physiological inputs generated by a user. In some instances, inputs may be transmitted to an appropriate network element for further processing. An NUI may implement any combination of speech recognition, touch and stylus recognition, facial recognition, biometric recognition, gesture recognition both on screen and adjacent to the screen, air gestures, head and eye tracking, and touch recognition associated with displays on the computing device 500. The computing device 500 may be equipped with depth cameras, such as stereoscopic camera systems, infrared camera systems, RGB camera systems, and combinations of these, for gesture detection and recognition. Additionally, the computing device 500 may be equipped with accelerometers or gyroscopes that enable detection of motion. The output of the accelerometers or gyroscopes may be provided to the display of the computing device 500 to render immersive augmented reality or virtual reality.

As can be understood, embodiments of the present disclosure provide for an objective approach for utilizing a password breach registry to secure a service. The present disclosure has been described in relation to particular embodiments, which are intended in all respects to be illustrative rather than restrictive. Alternative embodiments will become apparent to those of ordinary skill in the art to which the present disclosure pertains without departing from its scope.

From the foregoing, it will be seen that this disclosure is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. A computer-implemented method comprising:
   maintaining, by a first service provider, a local copy of a password breach registry, the local copy of the password breach registry protecting privacy of user queries, the password breach registry comprising password tokens provided by the first service provider, other service providers, or user devices, wherein the password tokens have been breached, and the password breach registry is a publicly accessible registry to which a service provider can subscribe;
   determining a first password of a first user account of a first service provided by the first service provider has been breached;
   writing a first password token corresponding to the breached first password of the first user account of a first service to the local copy of the password breach registry, the password tokens being a protected or encrypted version of passwords corresponding to users of services provided by the first service provider or other service providers;
   synchronizing the local copy of the password breach registry with the publicly accessible password breach registry, the synchronizing comprising broadcasting password tokens written to the local copy of the password breach registry to the other service providers and receiving password tokens of breached users from the other service providers; and
   locking the first user account out of the first service provided by the first service provider.

2. The method of claim 1, further comprising, querying the local copy of the password breach registry, by the first service provider, to determine if a second password token corresponding to second user account of the first service provided by the first service provider has been written to the password breach registry.

3. The method of claim 2, further comprising comparing the second password token to a plurality of first service tokens, the plurality of first service tokens corresponding to passwords of users accounts of the first service, each first service token corresponding to a first service password for the user of the service.

4. The method of claim 3, further comprising, based on the comparing, determining a first service token of the plurality of first service tokens matches the second password token.

5. The method of claim 4, further comprising locking the second user account out of the first service.

6. The method of claim 3, further comprising identifying a hash function corresponding to the second password token.

7. The method of claim 6, further comprising creating a plurality of comparable tokens, utilizing the identified hash function, by hashing passwords of user accounts of the first service.

8. The method of claim 7, further comprising comparing the second password token to the plurality of comparable tokens.

9. The method of claim 8, further comprising, based on the comparing, determining a comparable token of the plurality of comparable tokens is equivalent to the password token indicating a user account corresponding to the comparable token utilizes the same password for the first service and a breached service.

10. The method of claim 1, further comprising locking the second user account out of the first service.

11. One or more non-transitory computer storage media having computer-executable instructions embodied thereon that, when executed by a computer, causes the computer to perform operations, the operations comprising:
    maintaining, by a first service provider, a local copy of a password breach registry, the local copy of the password breach registry protecting privacy of user queries, the password breach registry comprising password tokens provided by the first service provider, other service providers, or user devices, wherein the password tokens have been breached, and the password breach registry is a publicly accessible registry to which a service provider can subscribe;
    determining a first password of a first user account of a first service provided by the first service provider has been breached;
    writing a first password token corresponding to the breached first password of the first user account of a first service to the local copy of the password breach registry, the password tokens being a protected or encrypted version of passwords corresponding to users of services provided by the first service provider or other service providers;
    synchronizing the local copy of the password breach registry with the publically accessible password breach registry, the synchronizing comprising broadcasting password tokens written to the local copy of the password breach registry to the other service providers and receiving password tokens of breached users from the other service providers;
    locking the first user account out of the first service provided by the first service provider; and
    querying the local copy of the password breach registry, by the first service provider, to determine if a second password token corresponding to a second user account of the first service has been written to the publically accessible password breach registry by another service provider of the other service providers.

12. The media of claim 11, further comprising comparing the second password token to a plurality of first service tokens, the plurality of first service tokens corresponding to passwords of users accounts of the first service, each first service token corresponding to a first service password for the user of the service.

13. The media of claim 12, further comprising, based on the comparing, determining a first service token of the plurality of first service tokens matches the second password token.

14. The media of claim 13, further comprising locking the second user account out of the first service.

15. The media of claim 11, further comprising identifying a hash function corresponding to the second password token.

16. The media claim 15, further comprising creating a plurality of comparable tokens, utilizing the identified hash function, by hashing passwords of user accounts of the first service.

17. The media of claim 16, further comprising comparing the second password token to the plurality of comparable tokens.

18. The media of claim 17, further comprising, based on the comparing, determining a comparable token of the plurality of comparable tokens is equivalent to the password token indicating a user account corresponding to the comparable token utilizes the same password for the first service and a breached service.

19. A computerized system comprising:
a hardware processor; and
a non-transitory computer storage medium storing computer-useable instructions that, when used by the hardware processor, causes the hardware processor to:
maintain, by a first service provider, a local copy of a password breach registry, the local copy of the password breach registry protecting privacy of user queries, the password breach registry comprising password tokens provided by the first service provider, other service providers, or user devices, wherein the password tokens have been breached, and the password breach registry is a publicly accessible registry to which a service provider can subscribe;
determine a first password of a first user account of a first service provided by the first service provider has been breached;
write a first password token corresponding to the breached first password of the first user account of a first service to the local copy of the password breach registry, the password tokens being a protected or encrypted version of passwords corresponding to users of services provided by the first service provider or other service providers;
synchronize the local copy of the password breach registry with the publicly accessible password breach registry, the synchronizing comprising broadcasting password tokens written to the local copy of the password breach registry to the other service providers and receiving password tokens of breached users from the other service providers;
lock the first user account out of the first service provided by the first service provider;
query the local copy of the password breach registry, by the first service provider, to determine if a second password token corresponding to a second user account of the first service has been written to the publically accessible password breach registry by another service provider of the other service providers, the determining comprising identifying a hash function corresponding to the second password token;
create a plurality of comparable tokens, utilizing the identified hash function, by hashing passwords of user accounts of the first service provided by the first service provider;
compare the second password token to the plurality of comparable tokens; and
based on the comparing, determine a comparable token of the plurality of comparable tokens corresponds to the second password token indicating a user account of the first service provided by the first service provider corresponding to the comparable token utilizes the same password for the first service and a breached service.

* * * * *